Sept. 28, 1954 C. J. McDOWALL 2,690,248
CLUTCH PLATE WITH GROOVES FOR LUBRICANT OR COOLANT
Filed Oct. 4, 1950 2 Sheets-Sheet 1

Inventor
Charles J. McDowall
By Willits, Helmig & Baillio
Attorneys

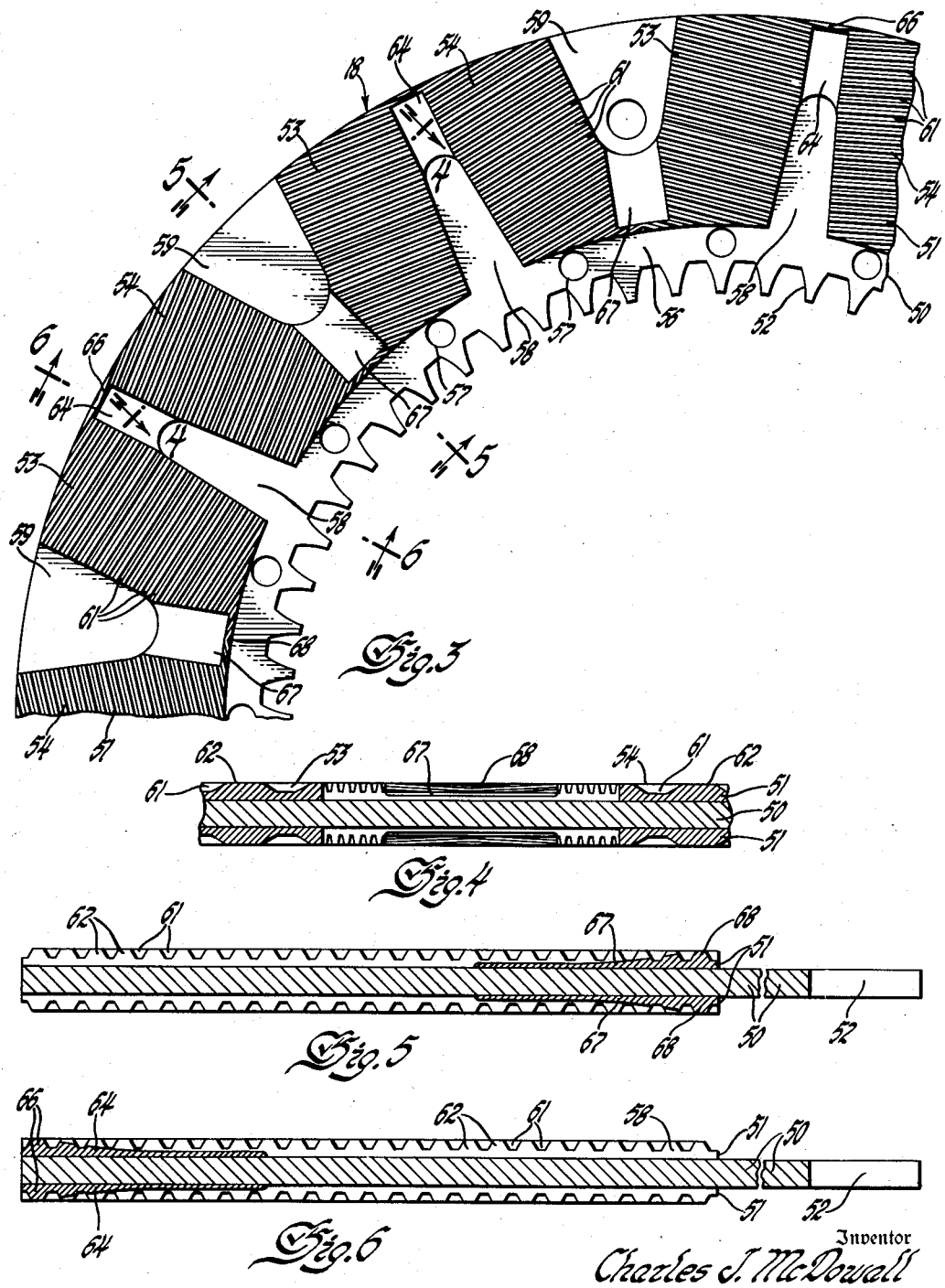

Patented Sept. 28, 1954

2,690,248

UNITED STATES PATENT OFFICE 2,690,248

CLUTCH PLATE WITH GROOVES FOR
LUBRICANT OR COOLANT

Charles J. McDowall, New Augusta, Ind., assignor to General Motors Corporation, Detroit, Mich., a corporation of Delaware Application October 4, 1950, Serial No. 188,419

15 Claims. (Cl. 192—113)

1

My invention relates to clutches, and more particularly to a clutch plate particularly adapted for use in a clutch subjected to heavy loads in which the clutch plates are cooled and lubricated by oil or an equivalent medium during the engagement of the clutch.

The clutch plate of the invention is particularly suitable for use in a clutch described and claimed in the copending application of Victor W. Peterson and Herbert H. Schnepel, Serial No. 174,052, filed July 15, 1950, entitled Aircraft Power System, of common ownership with this application. This clutch, which is used to clutch a gas turbine power unit to an aircraft propeller, must be light and compact, yet capable of standing up under the rigorous duty of coupling a gas turbine unit, at speeds of over 10,000 R. P. M., to a heavy propeller. As will be apparent, this service is particularly severe in its requirements on the plates of the clutch. It is necessary to flow lubricating and cooling fluid over the clutch plates during the period of slip when the clutch is engaged. Notwithstanding this, considerable difficulty has been experienced in providing a clutch plate which will operate smoothly and will have a satisfactory life in service. By virtue of my invention, the performance of the clutch and its endurance have been greatly improved. This improvement is presumably due to the form and configuration of the clutch plates, which are such as to provide adequate friction, smooth engagement, and the most satisfactory distribution of coolant to all of the engaged surface portions of the plates.

The principal objects of the invention are to improve the performance of clutches under rigorous service conditions, to improve clutch plates for use in clutches under such conditions, and to improve the flow and distribution of cooling or lubricating fluid in a clutch.

Other objects and advantages of the invention and the manner in which the objects and advantages are realized will be apparent to those skilled in the art from the detailed description herein of the preferred embodiment of the invention.

Figure 1:
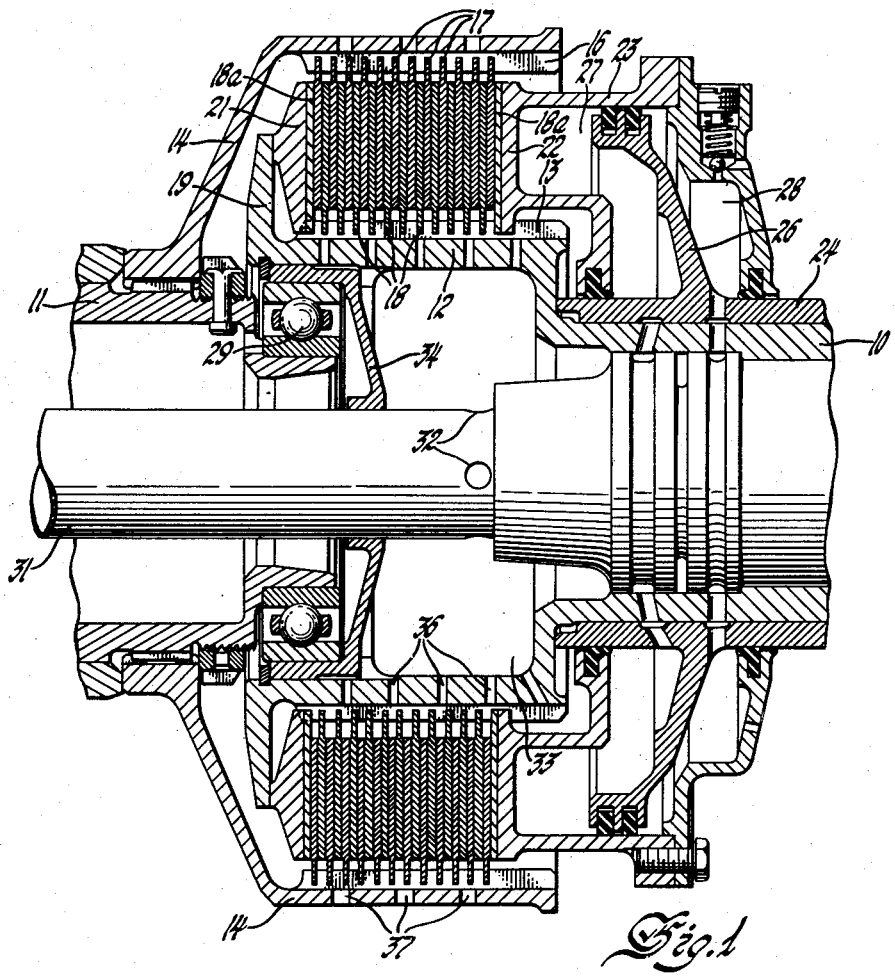
Figure 2:
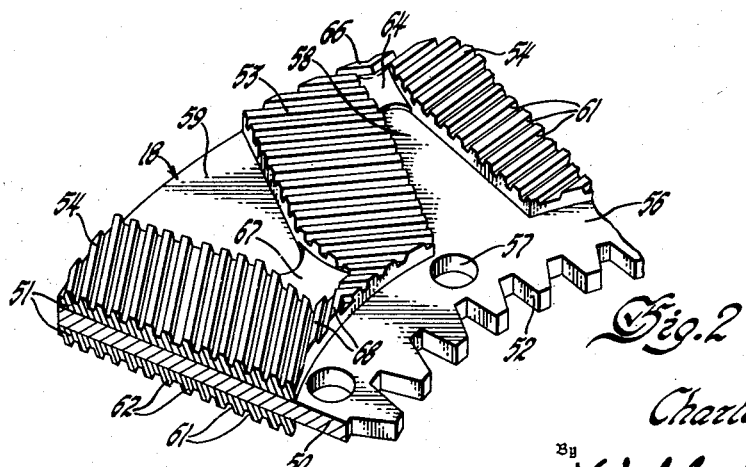

Referring to the drawings, Figure 1 is a longitudinal section of a clutch embodying clutch plates according to the invention; Figure 2 is an axonometric view of a portion of a clutch plate according to the invention; Figure 3 is a partial face view of the same; and Figures 4 to 6, inclusive, are enlarged sectional views taken on the planes indicated in Figure 3.

Although the clutch disk of the invention may

2 be employed in various clutches, it is believed desirable to describe briefly a clutch for which the preferred embodiment of the invention is particularly adapted. This clutch is described in detail in the abovementioned Peterson et al. application, but it is described in this specification to the extent necessary to an understanding of my invention.

Referring to Figure 1, the clutch provides a driving connection between shafts 10 and 11. The end of shaft 10 is formed into a drum or cylinder 12 formed with splines 13 on its outer surface which constitutes the inner member of the clutch. A second drum 14 fixed to the shaft 11 and provided with splines 16 on its inner surface is the outer member of the clutch. Clutch plates 17 of a first or outer set splined on their outer margins rotate with the drum 14, and clutch plates 18 of a second or inner set splined on their inner margins rotate with the member 12. These clutch plates are interleaved in the manner usual in multiple-plate clutches.

The drum 12 is formed with a flange 19 which receives the thrust of a backing ring 21 against which an end member 18a of the set of inner clutch plates bears. The other end clutch plate 18a, likewise splined to the inner member, is engaged by the head 22 of an annular cylinder 23 slidable on a sleeve 24 fixed to the shaft 10. A piston 26 integral with the sleeve 24 divides the cylinder 23 into a clutch-engaging chamber 27 and a clutch-releasing chamber 28. Fluid under pressure may be admitted to either of the chambers 27 and 28 by means immaterial to the present invention. Introduction of fluid into the chamber 27 urges the cylinder 23 against the clutch plates to engage the clutch. Introduction of fluid into the chamber 28 retracts the cylinder and releases the clutch. The inner drum 12 may be piloted on the reduced end portion of the shaft 11 by a ball bearing 29.

When the clutch is engaged, a cooling and lubricating fluid of any suitable composition, which will be referred to as oil for conciseness, is supplied by means immaterial to my invention through a tube 31 and escapes through radial passages 32 into a chamber 33 within the drum 12 which is closed by an annular plate or disk 34. This fluid discharges from chamber 33 through radial passages 36 distributed around the circumference of the drum 12, flows between the clutch plates, and leaves the clutch through passages 37 distributed around the circumference of the outer drum. The flow of the fluid from the chamber 33 between the clutch plates may be due to static pressure within the tube 31 and chamber 33 or centrifugal force when the drum 12 is rotated, or both.

The clutch plates 17 splined to the outer drum are steel disks with smooth surfaces, very slightly coned so that the drag between the two sets of plates is reduced when the clutch is released.

The structure described above is more fully described in the above mentioned Peterson et al. application, but the additional details of the structure are believed to be immaterial to an understanding of my invention.

Figures 2 to 6, inclusive, illustrate in detail the preferred form of the inner clutch plates 18. Each clutch plate 18 comprises a flat annular disk 50 of steel, on each face of which is a friction facing 51 of sintered bronze. Splines 52 are formed on the inner margin of the disk for engagement with the splines 13 of the drum 12. The friction facing is preferably a continuous ring composed of a number of sections 53 and 54 disposed alternately around the disk. The sections 53 and 54 are identical except that the sections 54 are of opposite hand to the sections 53. These sections extend from the outer margin of the disk inwardly to a circle concentric with the shaft and spaced outwardly from the bases of the spline teeth 52, thus providing an annular space between the inner portion 56 of the disk and the adjacent outer disk, into which the oil enters. A number of holes 57 through the portion 56 of the plate serve to equalize the distribution of oil longitudinally of the clutch. Preferably, there are ten friction sections of each of the sets 53 and 54 on each face of the disk.

Radial passages 58 for entrance of oil to the friction surface and radial passages 59 for discharge of oil to the periphery of the disks are disposed alternately between the sections 53 and 54. The friction sections 53 and 54 are ribbed or grooved to provide a plurality of oil-conducting grooves 61 separated by flat-topped ribs or lands 62, the faces of which are accurately finished to provide the engaging surface of the clutch plate. The lands and grooves 62 and 61 trend outwardly to some extent from the oil entry passages 58 to the outlet passages 59. While the grooves may be spiral if desired, they are preferably straight, and are preferably disposed at an angle of about 15 degrees to the radius of the disk. The outer ends of the inlet passages 58 are partially closed by portions 64 (Figures 2, 3, and 6) of sintered bronze which join alternate pairs 53 and 54 of the friction elements. As will be most clearly apparent in Figure 6, the portion 64 increases in thickness toward the outer rim of the disk until, at the margin of the disk, the direct outlet from the passage 58 is partially blocked by a bridge 66 which extends across the gap between adjacent sections 53 and 54 and is grooved along with those sections. In a generally similar manner (see Fig. 5), the inner ends of the outlet passages 59 become shallower due to a connecting section 67 of the sintered bronze which gradually increases in thickness toward the inner edge of the friction surface. The inner end of the passage 59 terminates in a bridging section 68 of the sintered metal, which is of full height and which is grooved as a continuation of the sections 53 and 54.

The cross section of each inlet passage 58 decreases progressively or converges toward the outer edge of the plate, and the cross section of each outlet passage 59 increases progressively or diverges toward the outer edge of the plate. This may be accomplished by progressively varying either the width or the depth of the passages or both. As will be apparent from the drawings the sides of each inlet passage 58 converge circumferentially toward the outer edge of the disk, whereas the sides of each outlet passage 59 diverge circumferentially. This arrangement, together with the variation in depth, insures an even and well distributed flow of oil through all the grooves 61. The oil flowing through the grooves 61 cools the clutch plate and, to a certain extent, the oil lubricates the friction faces or lands between the grooves. As will be noted particularly in Figures 5 and 6, the grooves are of trapezoidal cross-section, providing an obtuse angle between the face of each rib and the sides of the groove.

The end clutch plates 18a are similar to the clutch plates 18 except that the friction facing 51 is on one face only of the disk 50. The manufacture of the sintered bronze friction elements and the fixing thereof to the steel disks are accomplished by a known commercial process immaterial to the invention.

In the operation of the clutch, when oil is introduced through the passages 36 it enters the annular spaces between the portion 56 of each plate 18 and the adjacent plates 17 and flows through the converging passages 58, the flow branching off into the radiating passages 61, flowing through these passages into the passages 59 which diverge toward the outer rim. From the outer margins of the disks, the oil flows along the inner surface of drum 14 and escapes through the holes 37. Since the grooves 61 are directed outwardly to some extent from the passages 58 to the passages 59, centrifugal force aids in impelling oil through the grooves. It will be apparent to those skilled in the art that the structure described provides for uniform oil flow, lubrication, and cooling, and is particularly adapted to secure smooth operation and long life of the clutch.

The description herein of the preferred embodiment of the invention is not to be construed as limiting the scope of the invention, since many variations in structure may be effected by those skilled in the art within the scope of the invention.

I claim:

1. A clutch comprising, in combination, two plates, a rotatable member coupled to each plate, means for effecting frictional engagement of the plates, means for supplying fluid to the inner portion of the plates, and means defining a fluid outlet from the outer margin of the plates, one plate being formed on the face engaging the other plate with a grooved friction surface broken by a plurality of fluid inlet channels converging from the inner portion toward and terminating short of the outer margin thereof and a plurality of fluid outlet channels alternating with the inlet channels originating beyond the inner portion of the plate and diverging toward the outer margin of the plate.

2. A clutch comprising, in combination, two plates, a rotatable member coupled to each plate, means for effecting frictional engagement of the plates, means for supplying fluid to the inner portion of the plates, and means defining a fluid outlet from the outer margin of the plates, one plate being formed on the face engaging the other plate with a plurality of fluid inlet channels converging from the inner portion toward the outer margin thereof, a plurality of fluid outlet channels alternating with the inlet channels and diverging toward the outer margin of the plate, and a plurality of friction sections between the channels formed with grooves extending from the inlet to the outlet channels, the grooves trending outwardly from the inlet to the outlet channels.

3. A clutch comprising, in combination, two interleaved sets of plates, a rotatable member coupled to each set of plates, means for effecting frictional engagement of the plates, means for supplying fluid to the inner portion of the plates, and means defining a fluid outlet from the outer margin of the plates, the plates of one set being formed on the faces engaging the plates of the other set with a grooved friction surface broken by a plurality of fluid inlet channels converging from the inner portion toward and terminating short of the outer margin thereof and a plurality of fluid outlet channels alternating with the inlet channels originating beyond the inner portion of the plate and diverging toward the outer margin of the plates.

4. A clutch comprising, in combination, two interleaved sets of plates, a rotatable member coupled to each set of plates, means for effecting frictional engagement of the plates, means for supplying fluid to the inner portion of the plates, and means defining a fluid outlet from the outer margin of the plates, the plates of one set being formed on the faces engaging the plates of the other set with a plurality of fluid inlet channels converging from the inner portion toward the outer margin thereof, a plurality of fluid outlet channels alternating with the inlet channels and diverging toward the outer margin of the plates, and a plurality of friction sections between the channels formed with grooves extending from the inlet to the outlet channels, the grooves trending outwardly from the inlet to the outlet channels.

5. A clutch plate comprising an annular disk provided with a friction facing on at least one side thereof, the facing being disposed in sections circumferentially of the disk with radial fluid inlet and outlet passages alternating between the sections, the sections being joined by bridge portions at the outer ends of the inlet passages and at the inner ends of the outlet passages, and the sections and the bridge portions being provided with generally circumferentially extending grooves trending toward the outer margin of the disk in both circumferential directions from the inlet passages.

6. A clutch plate comprising an annular disk provided with a friction facing on at least one side thereof, the facing being disposed in sections circumferentially of the disk with radial fluid inlet and outlet passages alternating between the sections, the fluid inlet passages converging toward the outer margin and terminating short of the margin, the fluid outlet passages originating outwardly of the inner margin and diverging toward the outer margin, the sections being joined by bridge portions at the outer ends of the inlet passages and at the inner ends of the outlet passages, and the sections and the bridge portions being provided with generally circumferentially extending grooves trending toward the outer margin of the disk in both circumferential directions from the inlet passages.

7. A clutch plate comprising an annular disk provided with a friction facing on at least one side thereof, the facing being disposed in sections circumferentially of the disk with radial fluid inlet and outlet passages alternating between the sections, the fluid inlet passages extending from the inner edge of the friction surface toward the outer margin and terminating short of the margin, the fluid outlet passages originating outwardly of the inner margin and extending toward the outer margin, the sections being joined by bridge portions at the outer ends of the inlet passages and at the inner ends of the outlet passages, and the sections and the bridge portions being provided with generally circumferentially extending grooves trending toward the outer margin of the disk in both circumferential directions from the inlet passages, the major number of the grooves terminating in the outlet passages.

8. A clutch plate comprising an annular disk provided with a friction facing on at least one side thereof, the facing being disposed in sections circumferentially of the disk with radial fluid inlet and outlet passages alternating between the sections, the fluid inlet passages converging in width and depth toward the outer margin and terminating short of the margin, the fluid outlet passages originating outwardly of the inner margin and diverging in width and depth toward the outer margin, the sections being joined by bridge portions at the outer ends of the inlet passages and at the inner ends of the outlet passages, and the sections being provided with generally circumferentially extending grooves trending toward the outer margin of the disk in both circumferential directions from the inlet passages.

9. A clutch plate formed on at least one face with a grooved friction surface broken by a plurality of fluid inlet channels converging from the inner portion toward and terminating short of the outer margin thereof and a plurality of fluid outlet channels alternating with the inlet channels originating beyond the inner portion of the plate and diverging toward the outer margin of the plate.

10. A clutch plate formed on at least one face with a plurality of fluid inlet channels converging from the inner portion toward the outer margin thereof, a plurality of fluid outlet channels alternating with the inlet channels and diverging toward the outer margin of the plate, and a plurality of friction sections between the channels formed with grooves extending from the inlet to the outlet channels.

11. A clutch plate formed on at least one face with a plurality of fluid inlet channels converging from the inner portion toward the outer margin thereof, a plurality of fluid outlet channels alternating with the inlet channels and diverging toward the outer margin of the plate, and a plurality of friction sections between the channels formed with grooves extending from the inlet to the outlet channels, the grooves trending outwardly from the inlet to the outlet channels.

12. A clutch plate formed on at least one face with a plurality of fluid inlet channels extending from the inner portion toward the outer margin thereof, a plurality of fluid outlet channels alternating with the inlet channels and extending toward the outer margin of the plates, and a plurality of friction sections between the channels formed with grooves extending from the inlet to the outlet channels.

13. A clutch plate comprising an annular disk provided with a friction facing on at least one side thereof, the facing being disposed in sections circumferentially of the disk with radial fluid inlet and outlet passages alternating between the sections, the sections being joined by bridge portions at the outer ends of the inlet passages and at the inner ends of the outlet passages, and the sections being provided with generally circumferentially extending grooves trending toward the outer margin of the disk in both circumferential directions from the inlet passages.

14. A clutch comprising, in combination, two interleaved sets of plates, a rotatable member coupled to each set of plates, means for effecting frictional engagement of the plates, means for supplying fluid to the inner portion of the plates, and means defining a fluid outlet from the outer margin of the plates, the plates of one set being formed on the faces engaging the plates of the other set with a plurality of fluid inlet channels of progressively varying cross-sectional area and extending from the inner portion to near the outer margin thereof, a plurality of fluid outlet channels of progressively varying cross-sectional area alternating with the inlet channels and extending from adjacent the inner portion to the outer margin of the plates, and a plurality of friction sections between the channels, each said section defining a plurality of grooves extending from an inlet channel to an outlet channel.

15. A clutch plate comprising an annular disk provided with a friction facing on at least one side thereof, the facing being disposed in sections circumferentially of the disk with radial fluid inlet and outlet passages alternating between the sections, the sections being joined by bridge portions at the outer ends of the inlet passages and at the inner ends of the outlet passages, the sections being provided with generally circumferentially extending grooves trending toward the outer margin of the disk in both circumferential directions from the inlet passages and the bridge portions being provided with restricted outlet channels.

References Cited in the file of this patent

UNITED STATES PATENTS

| Number | Name | Date |
| --- | --- | --- |
| 986,324 | Brown et al. | Mar. 7, 1911 |
| 1,702,116 | Hoffman | Feb. 12, 1929 |
| 1,898,978 | Lane | Feb. 21, 1933 |
| 2,097,710 | Whitelaw et al. | Nov. 2, 1937 |
| 2,163,152 | Palm | June 20, 1939 |
| 2,163,884 | LaBrie | June 27, 1939 |
| 2,193,524 | Thompson | Mar. 12, 1940 |
| 2,523,501 | Davies et al. | Sept. 26, 1950 |
| 2,556,809 | Hobbs | June 12, 1951 |

FOREIGN PATENTS

| Number | Country | Date |
| --- | --- | --- |
| 742,120 | France | Feb. 28, 1933 |